United States Patent [19]
Whan

[11] Patent Number: 5,657,719
[45] Date of Patent: Aug. 19, 1997

[54] STRAINER STRUCTURE FOR AQUARIUM

[76] Inventor: Chin-fa Whan, No. 237-3, Tai Ping Rd., Tai Ping Hsiang, Taichung Hsien, Taiwan

[21] Appl. No.: 506,439

[22] Filed: Jul. 24, 1995

[51] Int. Cl.⁶ ................................................. A01K 63/00
[52] U.S. Cl. .............................. 119/263; 261/94; 210/169
[58] Field of Search ........................... 119/263, 254, 119/5; 261/77, 94, 95, 122.1; 210/169

[56] References Cited

U.S. PATENT DOCUMENTS

| | | |
|---|---|---|
| 2,844,912 | 7/1958 | Sebesta. |
| 3,326,185 | 6/1967 | Perez. |
| 4,236,488 | 12/1980 | Olds et al. .................... 119/5 |
| 5,034,165 | 7/1991 | Willinger et al. ............... 261/122 |
| 5,203,990 | 4/1993 | Gargiulo ....................... 210/169 |

*Primary Examiner*—Cary E. O'Connor
*Attorney, Agent, or Firm*—Bacon & Thomas

[57] ABSTRACT

A strainer structure for an aquarium, has an improved bubbles generator for producing finer bubbles and increasing oxygen solution. The micro bubbles generator is located between an air intake tube, and an oxygen solution tube and has a plurality of vent seams. When air is supplied from an air vent tube, air passes through the vent seams, into the water and is mixed with water to provide for the solution of oxygen in water. Improved oxygen solution by volume is achieved by forming a greater number of smaller bubbles by air passing through the by a plurality of vent seams. A surface of a sponge of the strainer has a saw-tooth shape which increase contact area with water and expands beneficial space for water animals to reside. A guide cap on which the sponge is mounted has a conical outer configuration to provide a conical area believes the guide cap and the sponge to increase the attachment sponge for water animals.

10 Claims, 12 Drawing Sheets

# STRAINER STRUCTURE FOR AQUARIUM

BACKGROUND OF THE INVENTION

The present invention relates to a strainer structure for aquarium, and particularly to a strainer having an air pump that may form bubbles by air pumped in the water for diffusion to increase oxygen solubility in the water when the aquarium is pumping air, for improving water quality and water circulation.

Generally speaking, an aquarium has a strainer which provides oxygen solution by pumping air and is beneficial to biological attachment so as to supply adequate oxygen content and suitable water quality for survival. A known type of biological strainer for an aquarium is shown as FIG. 1, comprising an oxygen solution tube 11 and an intake tube 12 at a proper height on said oxygen solution tube 11. Said oxygen solution tube 11 is set in the end of a connection body 13 corresponding to a drain hole 131. The external side of connection body 13 has a sponge 14. Said oxygen solution tube 11 and intake tube 12 are directly set together, so poor tightness exists on the seam 120, and on the end of connection body 13 at a circular setting slot 132 for oxygen solution tube 11 to set in. Drain hole 131 penetrates through the inlet hole 133 in connection body 13. When air is driven into the oxygen solution tube 11 by virtue of intake tube 12 suction against drain hole 131, and because the sponge 14 can allow water to infiltrate, causes water to flow into drain hole 131 by virtue of intake hole 133, enabling oxygen solution tube 11 to fill with water for producing oxygen solution with air driven from intake tube 12. However, it has following defects:

1. Referring to FIG. 1, when air is directly driven into the water by virtue of inlet tube 12, it is supplied through a single outlet tube so bubbles 15 formed by air in water are large, whereby oxygen gas in the bubbles 15 could hardly be soluble in water, i.e. bubble floating and escaping from water so that oxygen solution is not good.
2. The lash between said sponge 14 and connection body 13 is beneficial for attachment of water animals. However, because of a small lash, it may only provide a very small space for water animals to attach.
3. The seam 120 between oxygen solution tube 11 and intake tube 12 has poor tightness.

DETAILED DESCRIPTION OF PREFERRED EMBODIMENTS

Figure 1:
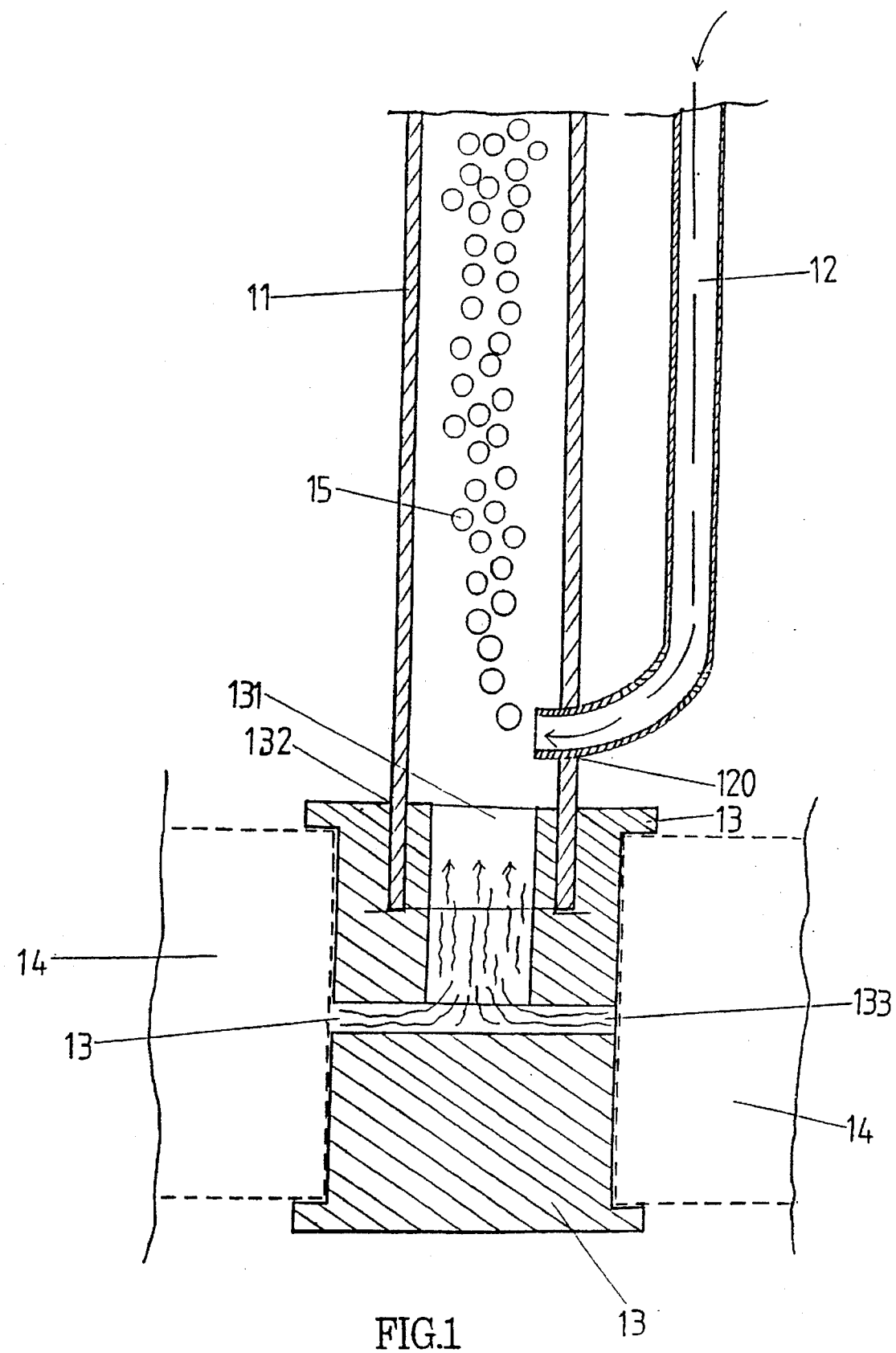
FIG. 1 is a cross-sectional view of a conventional type of strainer.
Figure 2:
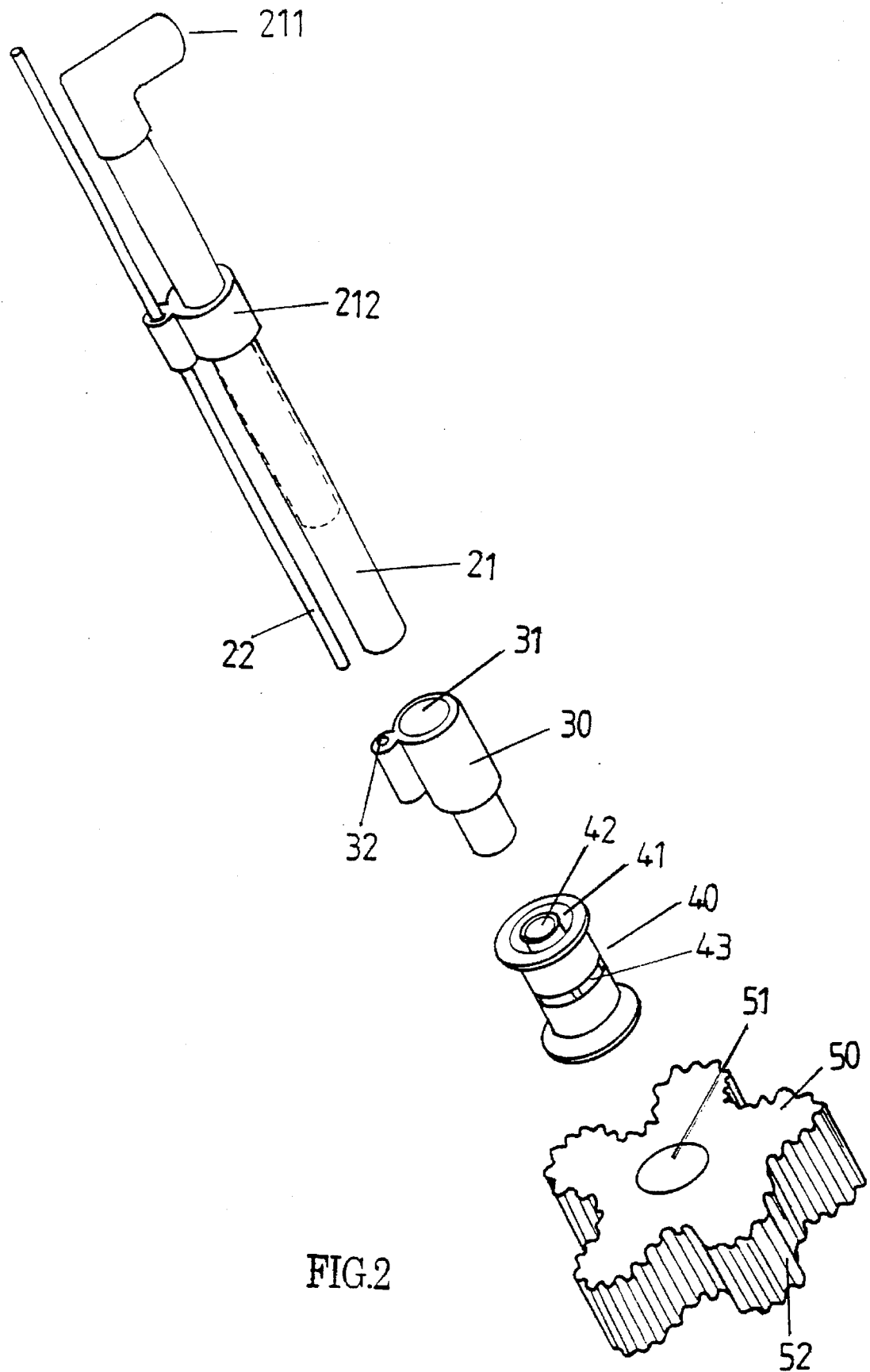
FIG. 2 is an exploded perspective view of the first embodiment of the present invention.
Figures 3A, 3B:
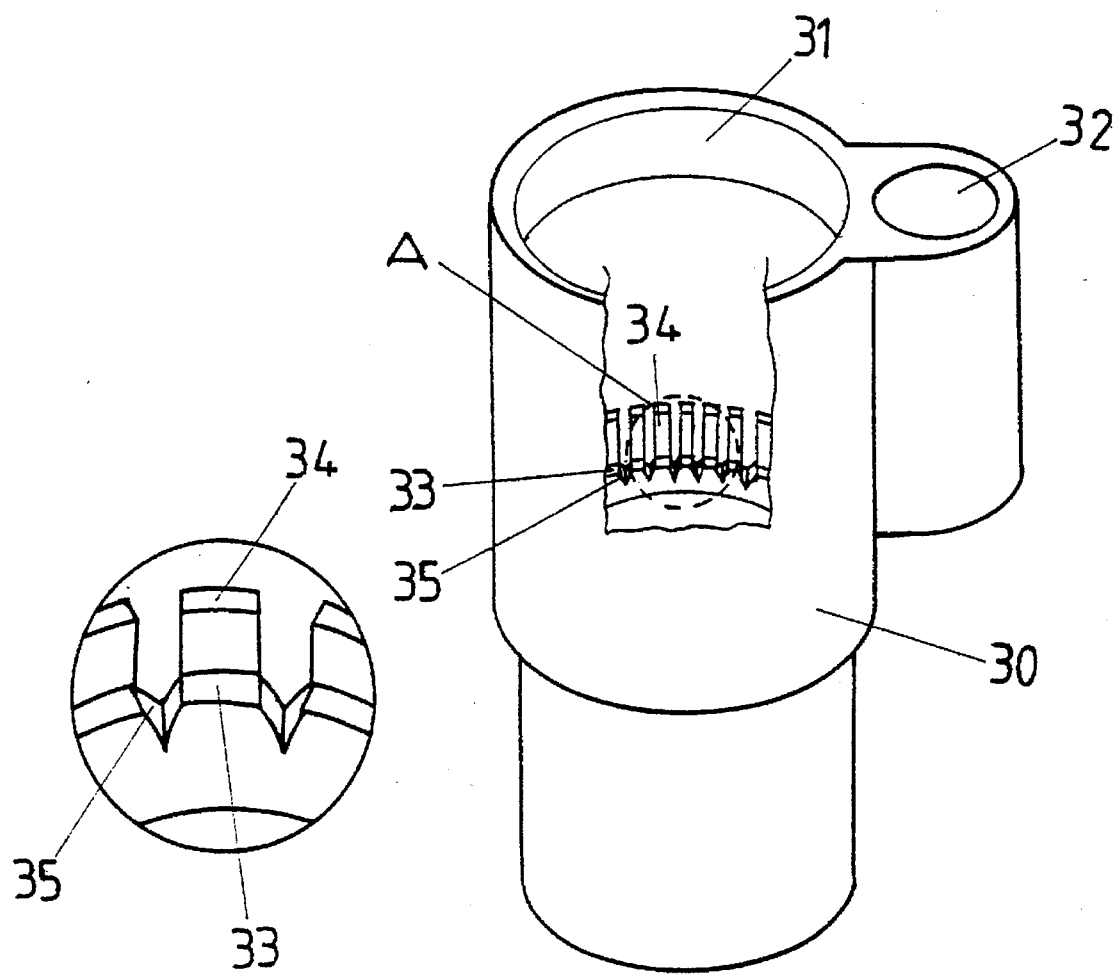
FIG. 3A is a perspective view, partially broken away showing the micro bubbles generator of the first embodiment of the present invention.
FIG. 3B is a partial, enlarged view of area A in FIG. 3A.

Referring to FIG. 2, the present invention comprises oxygen solution tube 21, intake tube 22, micro bubbles generator 30, connection body 40, and sponge 50. Said oxygen tube 21 is a hollow body, having air/water outlet 211. A connection cap 212 is provided for connecting with hollow intake tube 22. Said connection body 40 has a connection slot 41 in communication with drain hole 42 and intake hole 43. Said sponge 50 has a through connection hole 51, and a saw-tooth edge surface. The micro bubbles generator 30 (FIG. 3) is a hollow body, having intercommunication hole 31, air intake 32, and, on an internal wall, a plurality of bottom edges 33, flanges 34 to form a plurality of vent seams 35.

Referring to FIGS. 2–5, connection body 40 is inserted in the connection hole 51 of sponge 50, then micro bubbles generator 30 is inserted in the connection slot 41 of connecting body 40. Intake tube 22, and oxygen solution tube 21 are respectively inserted in the intake 32, and intercommunication hole 31 of bubbles generator 30. The oxygen solution tube 21 may be setting on the flange 34 with the help of the bottom edge of bubbles generator 30, and because of flange 34, the oxygen solution tube 21 and the wall of micro bubbles generator 30 form oxygen chamber 36. Oxygen solution tube 21 and generator wall are not tightly joined together to allow vent seam 35 and the intake 32 to communicate with intercommunication hole 31; with the aforesaid assembly, intake tube 22, oxygen solution tube 21, micro bubbles generator 30, connecting body 40, and sponge 50 can be integrated together.

Figure 4:
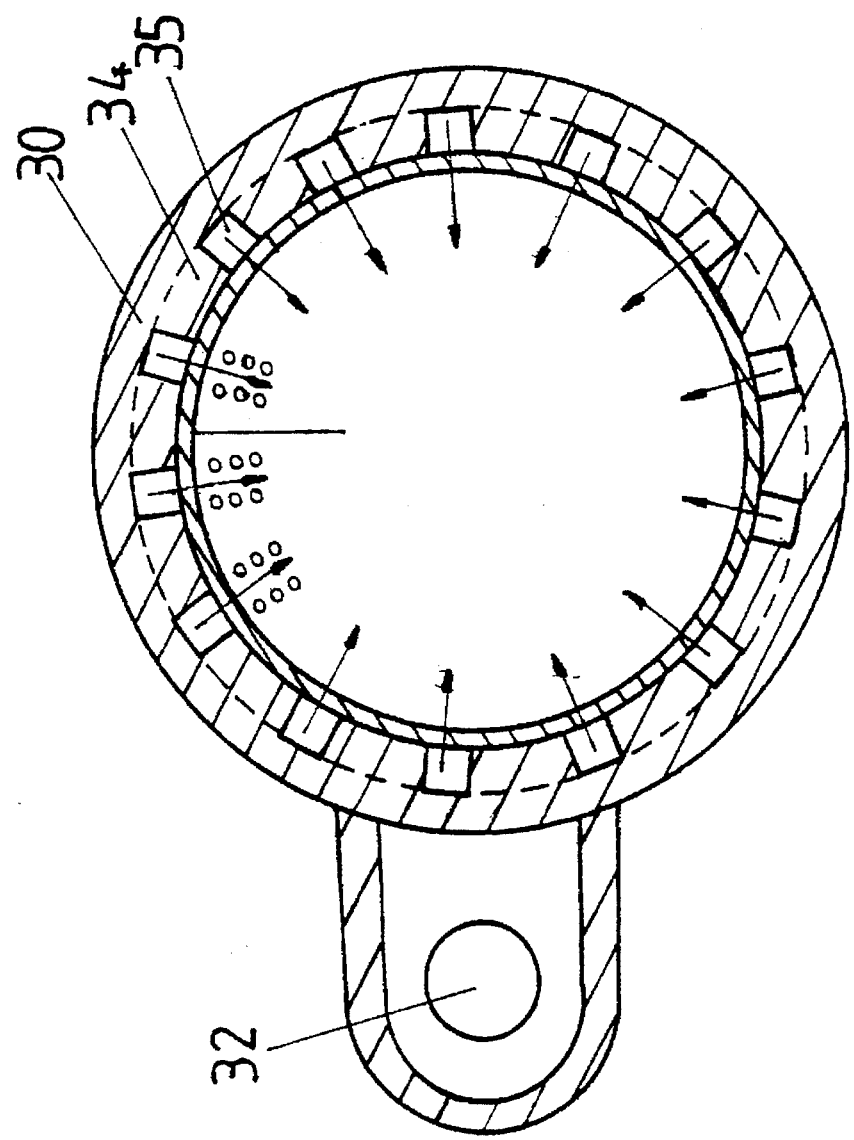
FIG. 4 is a cross-sectional view showing the micro bubbles generator and oxygen solution tube of the first embodiment of the present invention.
Figure 5:
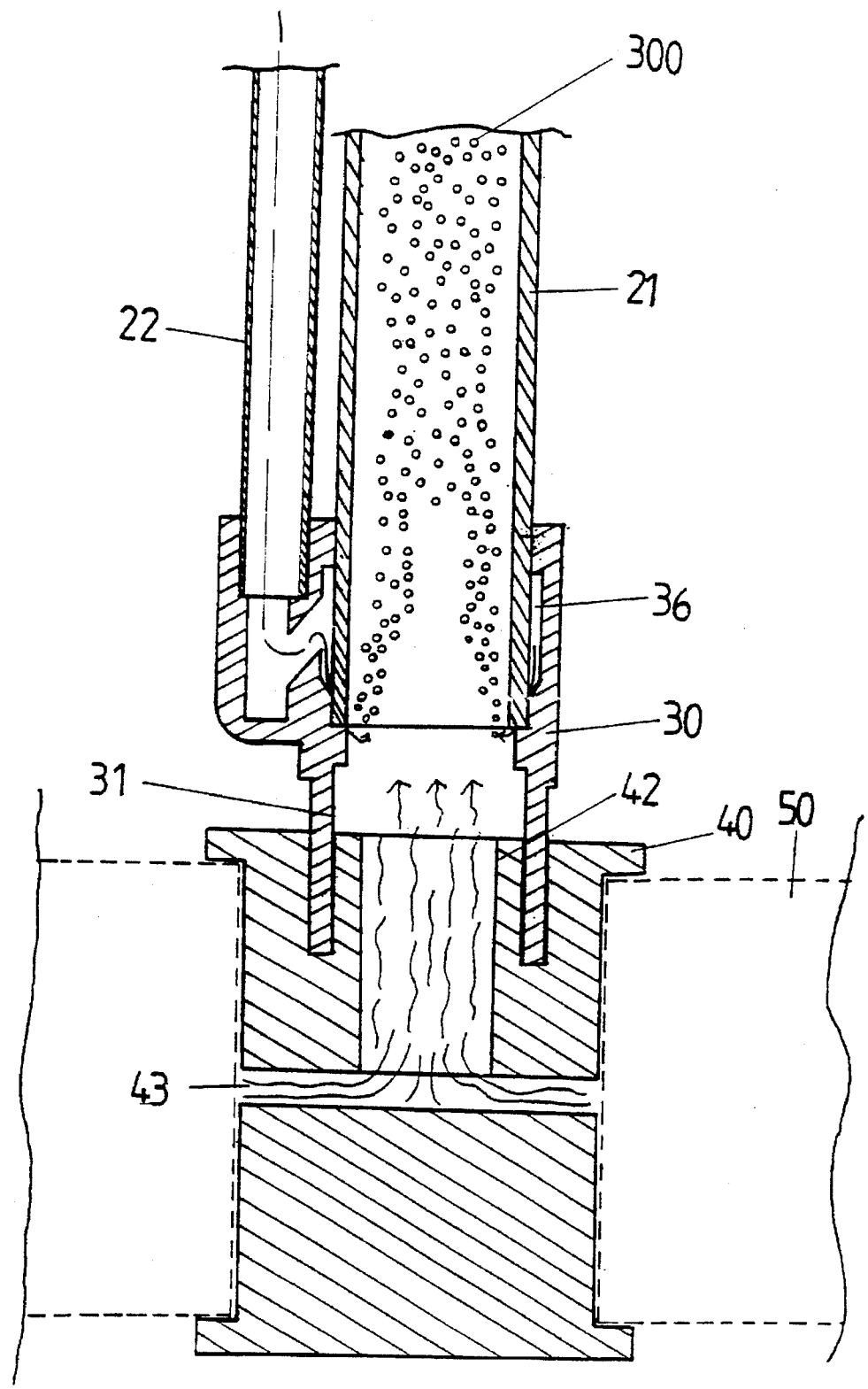
FIG. 5 is a cross-sectional view of the first embodiment of the present invention.

Referring to FIGS. 4 and 5, water may infiltrate intake hole 43, and drain hole 42 of connection body 40 by means of sponge 50, and may enter intercommunication hole 31 of bubbles generator 30 for filling up oxygen solution tube 21; when air is driven into the intake tube 22, air will enter circular air chamber 36 by means of inlet 32 of bubbles generator 30, and will enter intercommunication hole 31 through respective vent seams 35. It is understood that air supplied from air inlet 32 will be discharged from various vent seams 35 of air chamber 36, and will form multi-hole air outlet. Each air outlet is rather narrow to form smaller bubbles 300, and because of more outlets and bubbles, smaller bubbles 300 will be supplied to intercommunication hole 31, floating to contact with water in oxygen solution tube 21 such that oxygen dissolves in water. The present invention has the following advantages:

(1) With more volume and smaller sizes of bubbles 300, the chance of contact and area with water is so increased as to increase oxygen solution, to eliminate air vibration and to promote the effect of circulating filtration.

(2) It is convenient and tight for mounting the intake tube 22.

(3) The sponge 50 has saw-teeth face 52 for increasing the contact area between sponge 50 and water, thereby increasing beneficial biologic attachment area and volume.

Figure 6:
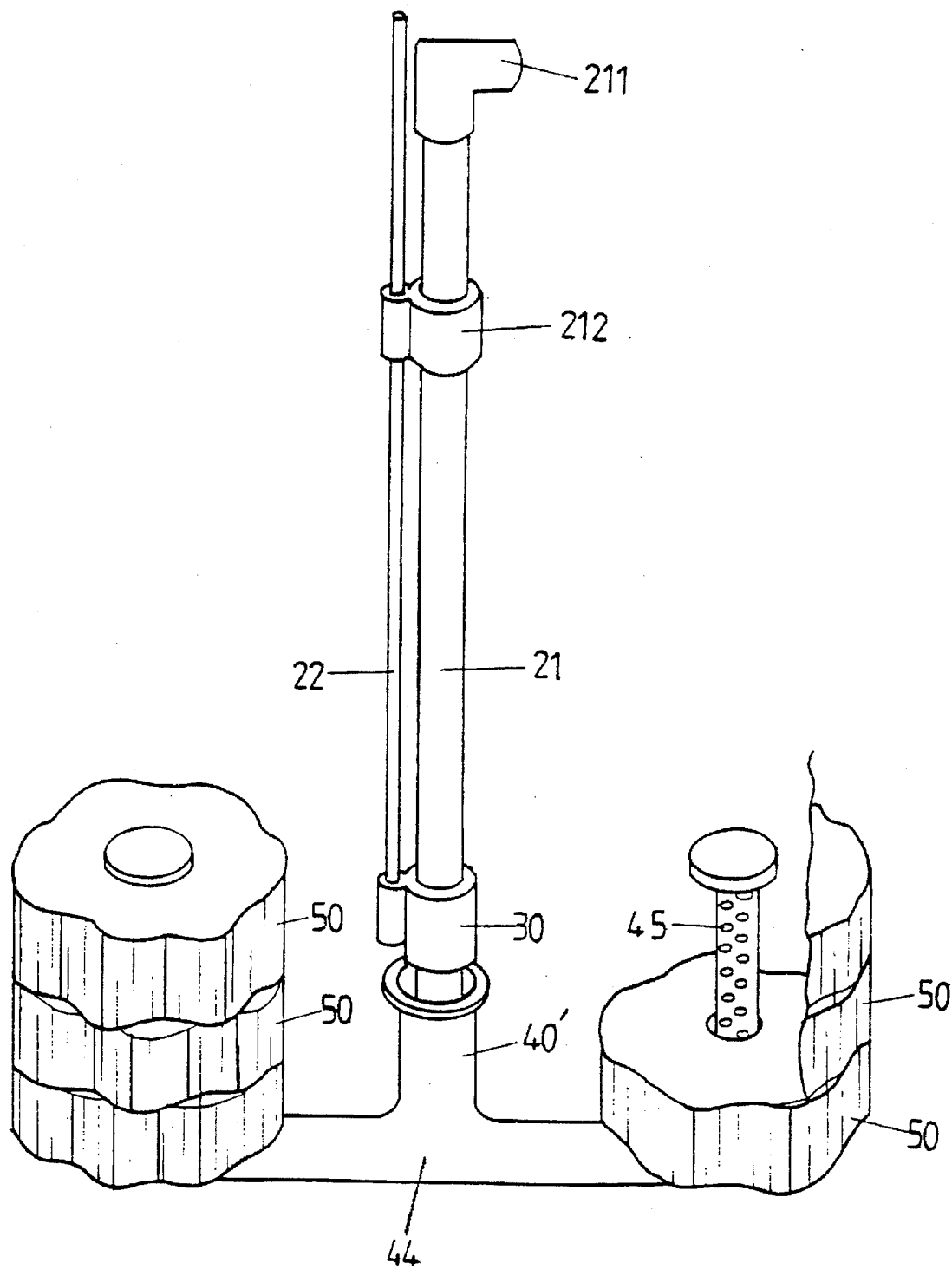
FIG. 6 is a perspective view showing the sponge of the first embodiment of the present invention.

The present invention also increases the area of sponge 50. Referring to FIG. 6, the connection body 40' is integrally made into T-shaped extension tube 44 having intake holes 45 thereon for insertion of sponges 50, to expand contact area between sponges 50 and water.

Figure 7:
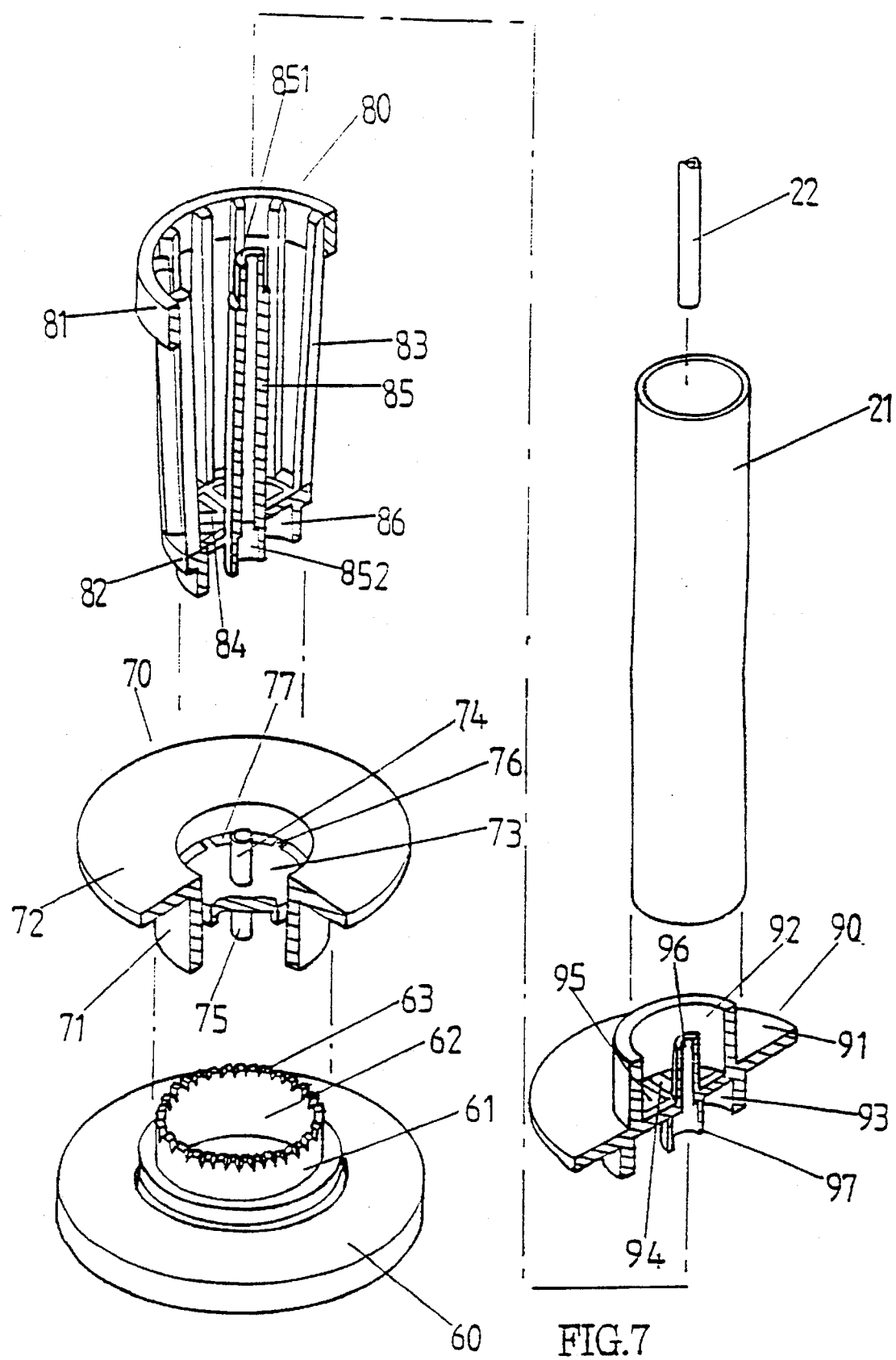
FIG. 7 is an exploded, perspective view partially in section showing the system of the second embodiment of the present invention.
Figure 8:
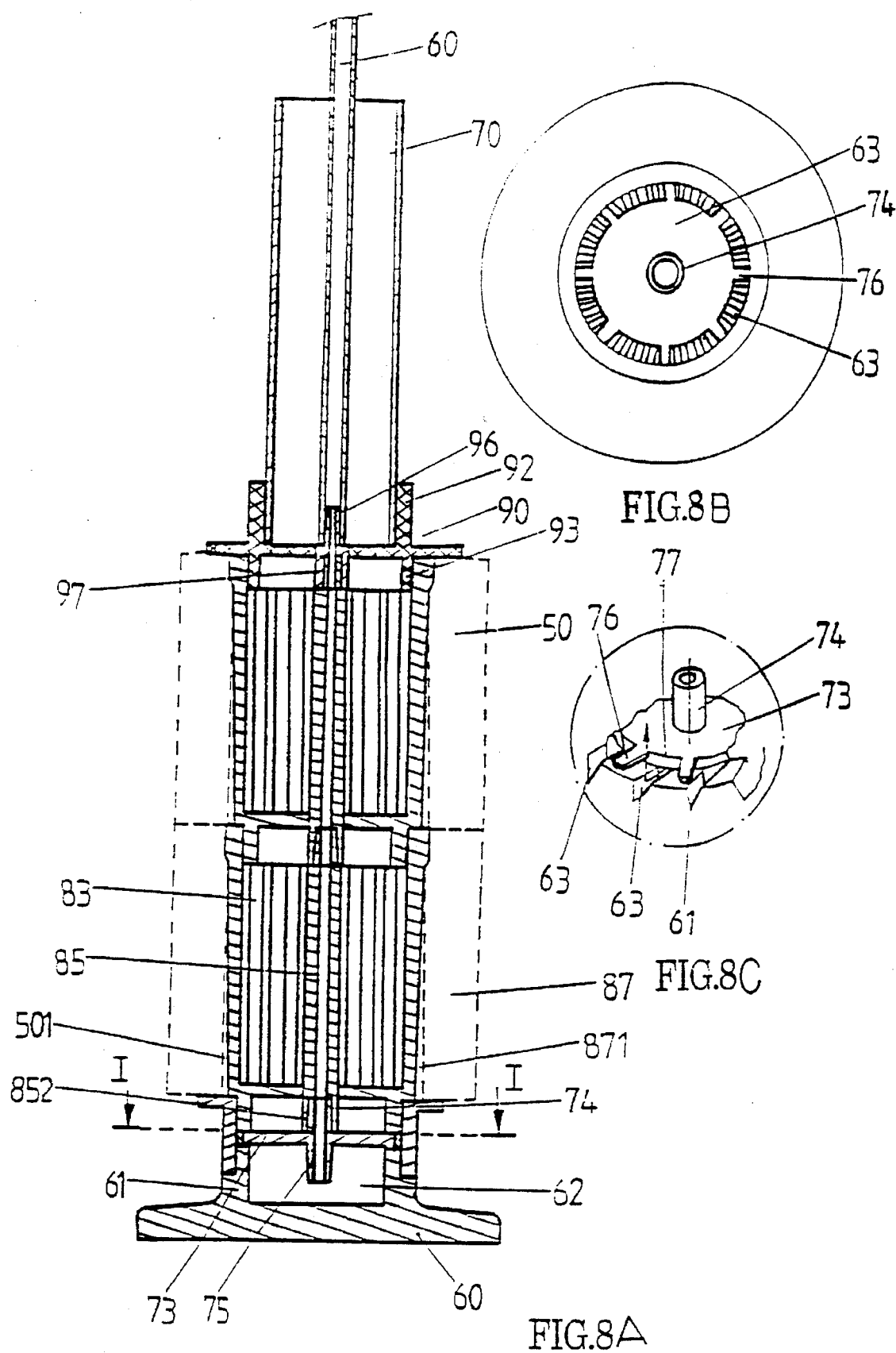
FIG. 8A is a cross-sectional view showing the assembly of the second embodiment of the present invention.
FIG. 8B is a cross-sectional view taken along line I—I in FIG. 8A.
FIG. 8C is a partial, enlarged view of the embodiment of FIG. 8A.
Figure 9:
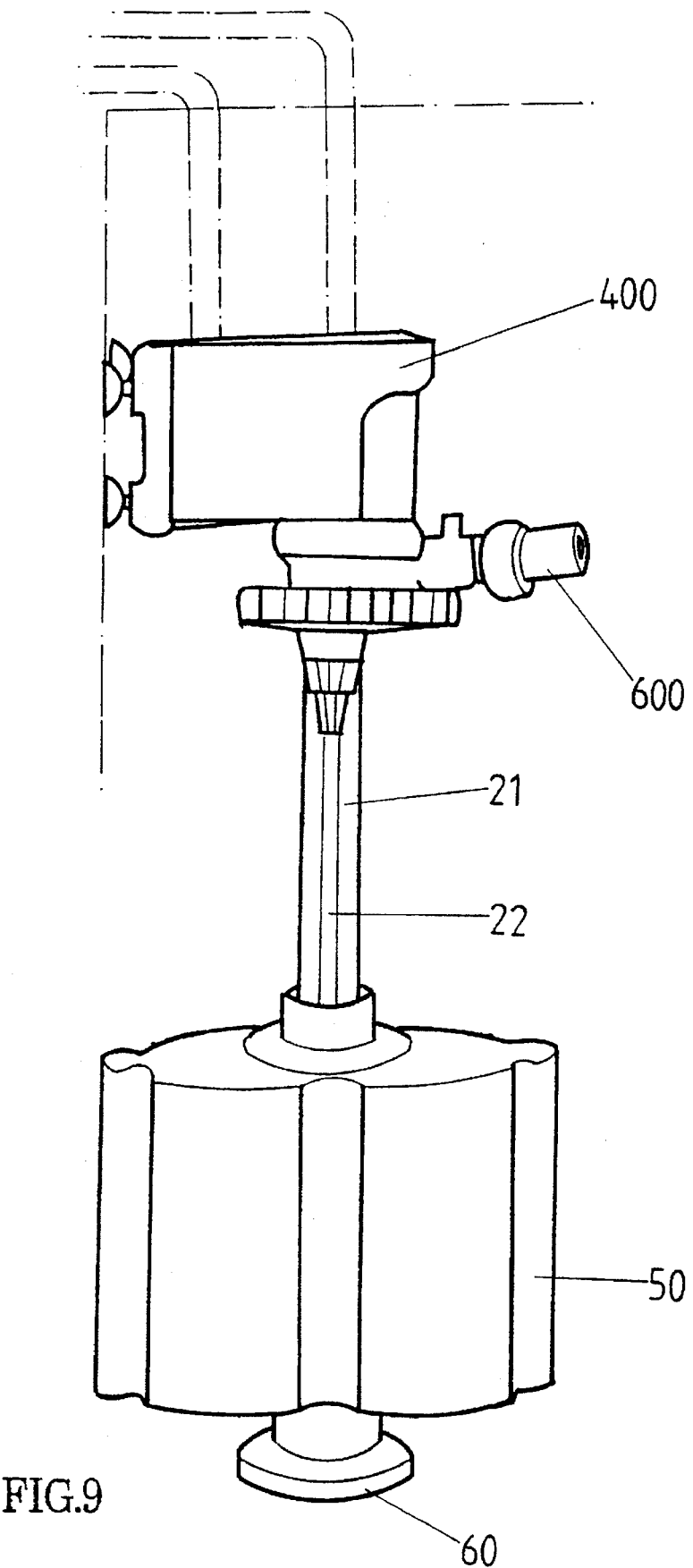
FIG. 9 is a perspective view showing the assembly of the second embodiment of the present invention.

Referring to FIGS. 7, 8, 9, a strainer comprises a base 60, a top end having a lower cover 70, with one or more guide caps 80 for guiding bubbles, an outer ring of guide caps 80 having a sponge 50, a top end of guide cap 80 having an upper cover 90, an end of upper cover 90 for setting intake tube 22 and oxygen solution tube 21 and connecting an air pump 400. Said base 60 resembles a disc, having an end face projecting with a ring wall 61 of an air collection chamber 62, the edge of said ring wall 61 having tooth-shape air slot openings 63.

Lower cover 70 has a hollow outer ring tube 71, one end of outer ring tube 71 extending with a flange 72 for receiving sponge 50, outer ring tube 71 having an end wall 73, each end of said end wall 73 extending with vent tubes 74, 75. Between said end wall 73 and outer ring tube 71 are a plurality of vent slots 77, and ribs 76 to enable outer ring tube 71, integrally to connect with end wall 73, said outer ring tube 71 connecting to the ring wall 61 of base 60, vent slot 77 corresponding to the edge of ring wall 61, and vent tube 75 on a lower end extending into the air collection chamber 62 of ring wall 61.

Guide cap 80, between top ring 81 and bottom ring 82 has equal-distance protection bars 83 arranged in a circular manner to form a net body, an outside diameter of the net body formed by protection bars 83 in conical form gradually reducing from top ring 81 to bottom ring 82. The net body 84 on the inside diameter of bottom ring 82 having air conduit 85 extending upwardly, and on a top end having union end 851 with a reduced diameter. Said air conduit 85 has a connecting end 852 extending downwardly from the other end of net body 84. On the bottom end of bottom ring 82 is a hollow union ring 86 with a smaller diameter than bottom ring 82, said union ring 86 is slightly tight for setting in the inner shaft hole of lower cover 70 in which connection end 852 is joined to vent tube 74. The perimeter of ring-layout protection bars 83 may fit into a sponge 50.

Upper cover 90, on the upper and lower ends of flange 91 has hollow upper ring 92 and lower ring 93, in the inside bore having several ribs 94 lining up to form vent slots 95 therebetween. Each end of connection center of each rib 94 extending with a hollow and through union end 96 and connection end 97, the inner bore of union ring 96 is provided for connecting to the vent tube 22 and oxygen solution tube 21. The outer shaft of lower ring 93 slightly connecting to the inner bore formed by protection bars 83 of guide cap 80, the union end of connecting end 97 and air conduit 85 are joined by the union end 851.

Figure 11:
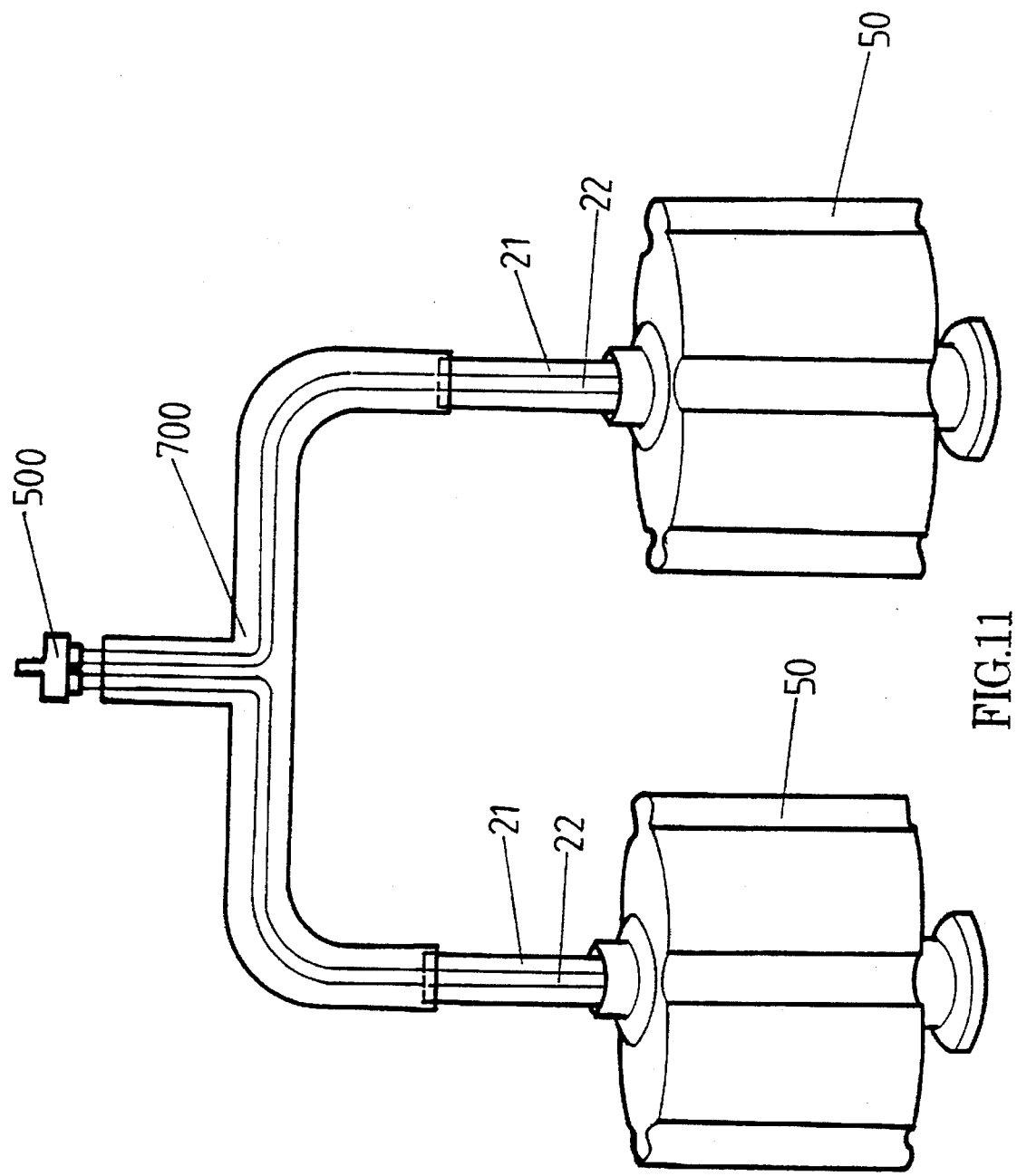
FIG. 11 is a perspective view showing a parallel connection of the second embodiment of the present invention.
Figure 12:
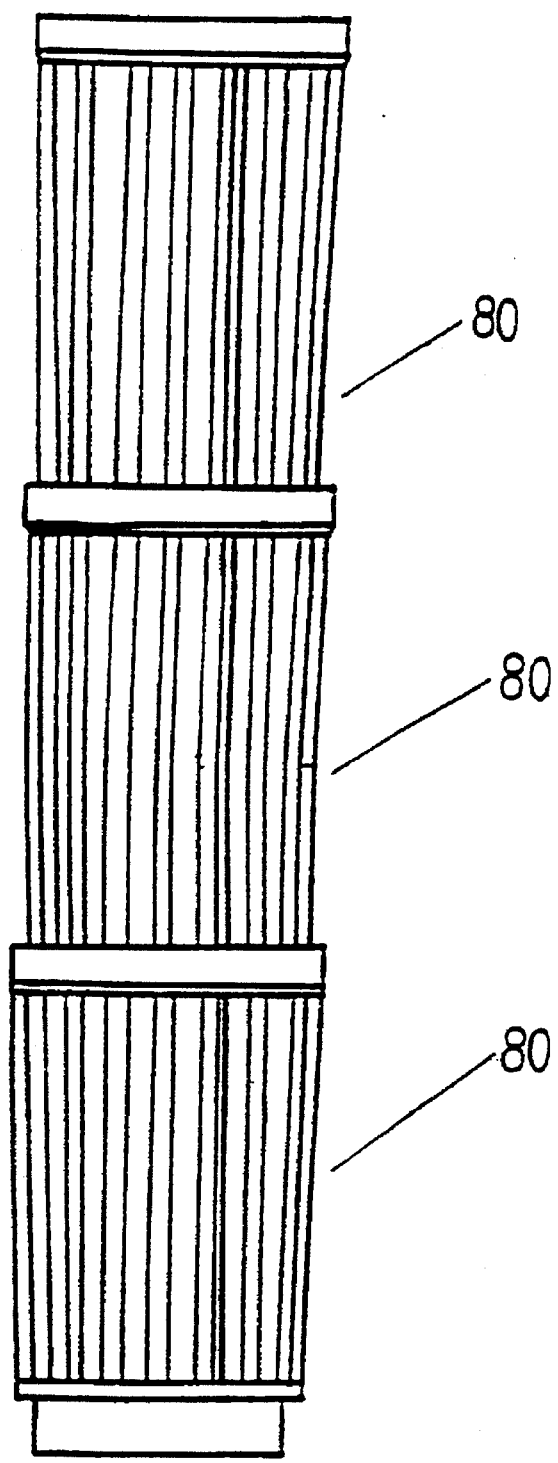
FIG. 12 is a side view of a serial connection of the guide cap of the second embodiment of the present invention.

Referring to FIGS. 8, 9, said guide cap 80 may, subject to the size of the aquarium, be a single to match a single sponge 50 (FIG. 9), or may be two or more sets in series as shown on FIG. 12. The serial connection mentioned above may be changed into parallel connection as shown on FIG. 11, for serial connection of oxygen solution tube 21 to a parallel-connection tube 700 with several pipe joints, and intake tube 22 connected to the joint 500 and which is connected to air pump 400.

Figure 10:
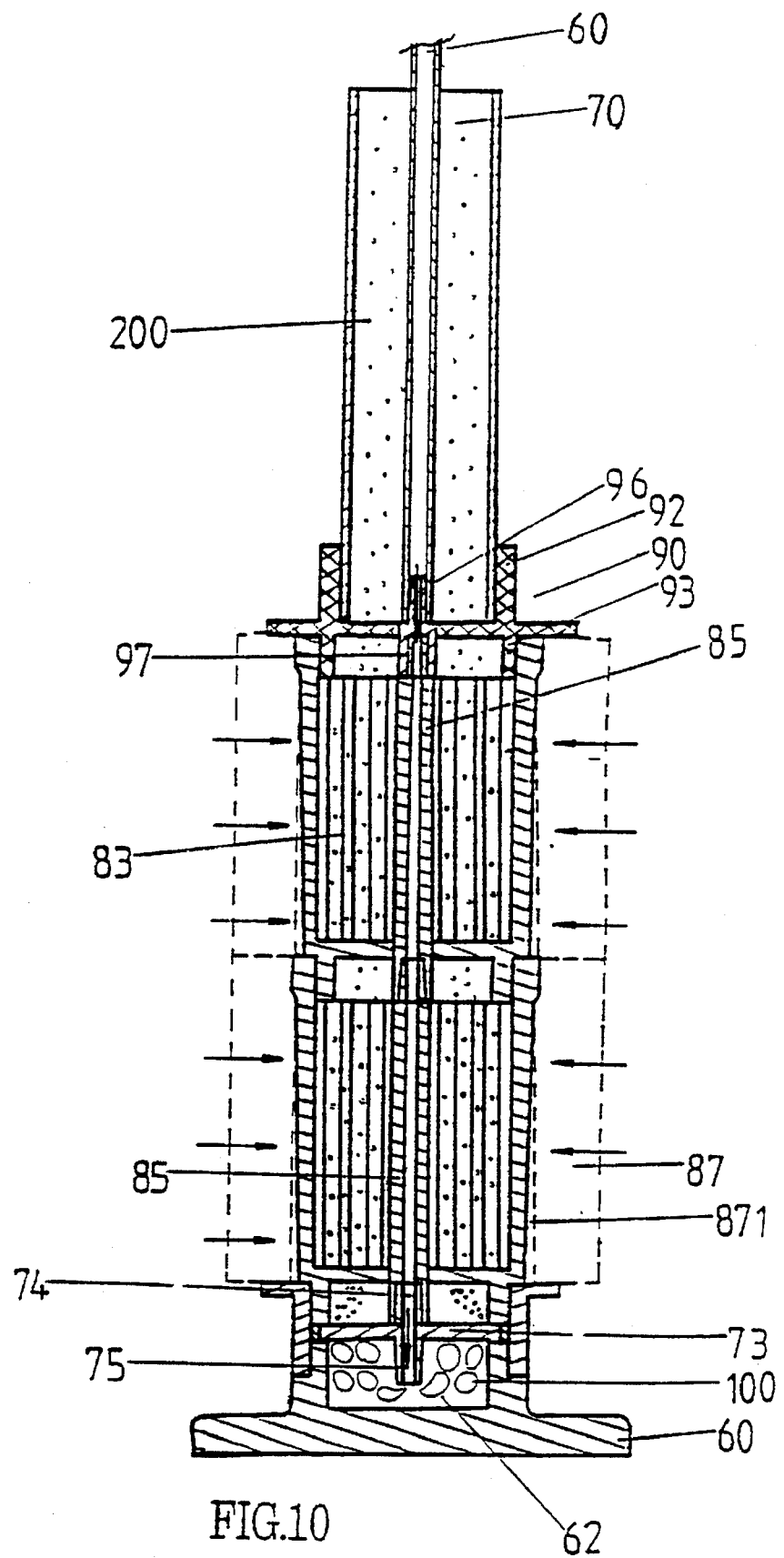
FIG. 10 is a diagrammatic view showing the flow of bubbles of the second embodiment of the present invention.

Referring to FIGS. 9, 10, said air pump 400 supplies air through intake tube 22, into the air collection chamber 62 on the base 60 by virtue of union end 96 of upper cover 90, air conduit 85 of guide cap 80 (or through the air conduit 85 of several guide caps 80 for serial connection of a plurality of guide caps), and sponge 50 of strainer sinking in water for water infiltration to fill up the strainer by virtue of the lash between protection bars 83 of guide cap 80. When air is discharged into air collection chamber 62, a group of grain-type bubbles 100 float up to form bubbles 100 continuing to fall up the air collection chamber 62. Because of end wall 73, the bubbles 100 flow toward air slot opening 63, and because the notch of air slot opening 63 is very small, larger bubbles 100 will be forced to diffuse into tiny bubbles 200 which float up through vent slot 77 and flow into oxygen solution tube 21 by virtue of guide caps 80 and upper cover 90. When tiny bubbles 200 are produced, oxygen solution will be gradually functioning with guide caps 80 and water in oxygen solution tube 70. Outlet tube 600 of air pump 400 may supply water containing a large volume of oxygen solution and tiny bubbles 200 not dissolved in water. Floating bubbles 200 will produce a suction force by virtue of lash between protection bars 83 of guide caps 80 for sucking water flow outside sponge 50 for infiltration to-form convection.

Referring to FIG. 8 said protection bars 83 of said guide caps 80 have a conical configuration on the outside diameter whereby a conic space 501 is formed between a straight bore of the inner hole of sponge 50, which has the most oxygen solution contents as a beneficial bed for water animals. Therefrom conical space 501 provides larger attaching room for water animals residing and breeding in the inner bore of sponge 50 and on outer sides of protection bars 83 so that it is beneficial to improving water quality and the expansion of said conic space 501 is beneficial to attachment of water animals, while leaving adequate lash for water flow to pass for reducing obstructions.

According to the aforesaid statement, the present invention has following advantages:

1. The bubbles formed are smaller and more in quantity, and are soluble in water (oxygen solution) faster to increase water oxygen content.
2. The protection bars arranged in a circular manner around said guide cap form a conical space between with the inside hole of the sponge for increasing beneficial attachment space for water animals and therefore promote improvement of water quality.
3. The guide cap of the present invention may have multiple serial connections subject to the size of the aquarium.
4. The strainer of the present invention may be connected in parallel subject to the size of aquarium so as to improve oxygen content and clarity of water in the aquarium.

I claim:
1. A strainer structure for an aquarium comprising:
   a) a first body having a plurality of water inlets and an outlet communicating with the plurality of water inlets;
   a sponge filter located on the first body so as to cover the plurality of water inlets;
   c) an oxygen solution tube in fluid communication with the outlet of the body;
   d) a second body connected to the first body and having a plurality of tooth shaped air slot openings; and,
   e) an air intake tube connected to the second body to supply air to the second body such that the air passes through the plurality of tooth shaped air slot openings to form micro bubble in water in the oxygen solution tube.

2. The strainer structure of claim 1 wherein the sponge filter has a saw-tooth shaped outer periphery.

3. The strainer structure of claim 1 wherein the first body has a substantially "T"-shaped configuration.

4. The strainer structure of claim 3 further comprising a plurality of sponge filters located on the first body.

5. The strainer structure of claim 1 wherein the second body comprises a micro bubble generator connected to the first body, the oxygen solution tube and the air intake tube, the micro bubble generator forming a chamber around an end of the oxygen solution tube such that air from the air intake tube passes into the chamber before passing through the plurality of tooth-shaped air slot openings.

6. The strainer structure of claim 1 wherein the second body composes a base having an annular projecting wall forming the plurality of tooth-shaped air slot openings and a lower cover with an end wall having a plurality of vent slots connected to the base and to the first body.

7. The strainer structure of claim 6 further comprising a plurality of first bodies, each first body having a sponge filter.

8. The strainer structure of claim 6 wherein the first body comprises a guide cap having an upper ring and a lower ring connected by a plurality of spaced apart protection bars.

9. The strainer structure of claim 8 further comprising an air conduit extending through the bottom ring.

10. The strainer structure of claim 8 wherein outer surfaces of the protection bars form a generally conical configuration.

* * * * *